(12) United States Patent
Martin et al.

(10) Patent No.: US 10,857,735 B1
(45) Date of Patent: Dec. 8, 2020

(54) APPARATUS AND METHOD FOR ADDITIVE MANUFACTURING AND DETERMINING THE DEVELOPMENT OF STRESS DURING ADDITIVE MANUFACTURING

(71) Applicant: HRL LABORATORIES, LLC, Malibu, CA (US)

(72) Inventors: John H. Martin, Los Angeles, CA (US); Brennan D. Yahata, Los Angeles, CA (US); Eric Clough, Santa Monica, CA (US)

(73) Assignee: HRL Laboratories, LLC, Malibu, CA (US)

( * ) Notice: Subject to any disclaimer, the term of this patent is extended or adjusted under 35 U.S.C. 154(b) by 280 days.

(21) Appl. No.: 15/958,676

(22) Filed: Apr. 20, 2018

Related U.S. Application Data

(60) Provisional application No. 62/489,559, filed on Apr. 25, 2017.

(51) Int. Cl.
*B29C 64/386* (2017.01)
*G01N 29/12* (2006.01)
(Continued)

(52) U.S. Cl.
CPC .......... *B29C 64/386* (2017.08); *B29C 64/153* (2017.08); *B29C 64/188* (2017.08);
(Continued)

(58) Field of Classification Search
CPC ... B29C 64/153; B29C 64/188; B29C 64/194; B29C 64/20; B29C 64/386; B29C 64/393; B33Y 10/00; B33Y 30/00; B33Y 50/02; G01N 29/12; G01N 29/46; G01N 2291/014; G01N 2291/0231; G01N 2291/0237;
(Continued)

(56) References Cited

U.S. PATENT DOCUMENTS

8,488,871 B2 * 7/2013 Matsumoto .......... G01N 29/262
382/154
8,811,721 B2 * 8/2014 Matsumoto .......... G01N 29/069
382/154
(Continued)

*Primary Examiner* — Benjamin A Schiffman
(74) *Attorney, Agent, or Firm* — Lewis Roca Rothgerber Christie, LLP (57) ABSTRACT

A method of additive manufacturing a part on a build plate includes additive manufacturing at least a first layer of the part on the build plate, supplying a series of frequencies to the build plate from a resonate probe connected to the build plate, processing a received response from an ultrasonic detector connected to the build plate, determining a series of resonant frequencies of the build plate and a corresponding series of peak intensities from the received response, comparing the resonant frequencies and the corresponding peak intensities to a set of reference resonant frequencies and a corresponding set of reference peak intensities, respectively, calculating an intensity difference between a peak intensity and a reference peak intensity or a frequency difference between a resonant frequency and a reference resonant frequency, and additive manufacturing a subsequent layer of the part if the intensity difference and the frequency difference are below a threshold.

20 Claims, 3 Drawing Sheets
(1 of 3 Drawing Sheet(s) Filed in Color)

(51) Int. Cl.
*G01N 29/46* (2006.01)
*B33Y 10/00* (2015.01)
*B33Y 30/00* (2015.01)
*B29C 64/153* (2017.01)
*B29C 64/194* (2017.01)
*B29C 64/20* (2017.01)
*B29C 64/188* (2017.01)
*B29C 64/393* (2017.01)
*B33Y 50/02* (2015.01)

(52) U.S. Cl.
CPC ............ *B29C 64/194* (2017.08); *B29C 64/20* (2017.08); *B33Y 10/00* (2014.12); *B33Y 30/00* (2014.12); *G01N 29/12* (2013.01); *G01N 29/46* (2013.01); *B29C 64/393* (2017.08); *B33Y 50/02* (2014.12); *G01N 2291/014* (2013.01); *G01N 2291/0231* (2013.01); *G01N 2291/0237* (2013.01); *G01N 2291/0289* (2013.01); *G01N 2291/02827* (2013.01); *G01N 2291/044* (2013.01); *G01N 2291/269* (2013.01); *G01N 2291/2632* (2013.01)

(58) Field of Classification Search
CPC . G01N 2291/02827; G01N 2291/0289; G01N 2291/044; G01N 2291/2632; G01N 2291/269
See application file for complete search history.

(56) References Cited

U.S. PATENT DOCUMENTS

| | | | | |
|---|---|---|---|---|
| 9,999,924 B2* | 6/2018 | Dave | ...................... | B33Y 30/00 |
| 10,139,808 B2* | 11/2018 | Engelbart | ............. | B33Y 10/00 |
| 10,234,848 B2* | 3/2019 | Mehr | ..................... | G06N 20/10 |
| 10,336,007 B2* | 7/2019 | Boyer | ..................... | G01J 5/004 |
| 10,350,876 B2* | 7/2019 | Ng | ........................ | B22F 3/1055 |
| 10,449,721 B2* | 10/2019 | Chung | ................... | B22F 3/008 |
| 10,562,288 B2* | 2/2020 | Lavrentyev | ............. | B33Y 50/02 |
| 10,675,684 B2* | 6/2020 | DeFelice | ............... | G01N 29/04 |
| 2007/0176312 A1* | 8/2007 | Clark | ................... | B23K 15/0086 |
| | | | | 264/40.1 |
| 2011/0162455 A1* | 7/2011 | Renzel | ................. | G01N 29/343 |
| | | | | 73/632 |
| 2016/0184893 A1* | 6/2016 | Dave | ...................... | B33Y 50/02 |
| | | | | 419/53 |
| 2016/0325541 A1* | 11/2016 | Lavrentyev | ............. | B29C 64/386 |
| 2017/0008126 A1* | 1/2017 | Long | ..................... | B22F 3/1055 |
| 2017/0028703 A1* | 2/2017 | Xu | ..................... | G01N 29/4436 |
| 2017/0312821 A1* | 11/2017 | DeFelice | ............... | B22F 3/1055 |
| 2018/0067476 A1* | 3/2018 | Engelbart | ............... | B64F 5/10 |
| 2018/0341248 A1* | 11/2018 | Mehr | ................. | G05B 19/4099 |
| 2018/0361668 A1* | 12/2018 | Kim | ........................ | B22F 3/008 |
| 2019/0015901 A1* | 1/2019 | Haberland | ......... | G01N 29/4427 |
| 2019/0105840 A1* | 4/2019 | Chung | ................... | B28B 17/0072 |
| 2019/0184618 A1* | 6/2019 | Lin | ..................... | B29C 64/241 |
| 2020/0009656 A1* | 1/2020 | Kamel | ................. | B23K 26/342 |
| 2020/0049648 A1* | 2/2020 | Kunc | ..................... | B29C 64/393 |

* cited by examiner

APPARATUS AND METHOD FOR ADDITIVE MANUFACTURING AND DETERMINING THE DEVELOPMENT OF STRESS DURING ADDITIVE MANUFACTURING

CROSS-REFERENCE TO RELATED APPLICATION(S)

The present application claims priority to and the benefit of U.S. Provisional Application No. 62/489,559, filed Apr. 25, 2017, the entire content of which is incorporated herein by reference.

FIELD

The present disclosure relates generally to additive manufacturing and a system and a method for determining the development of stress during additive manufacturing.

BACKGROUND

Additive manufacturing is a process by which components are fabricated through layer-by-layer deposition. During the additive manufacturing process, heat is applied sequentially on each layer. The heat may be applied differently (e.g., with a different frequency) in different areas of the different layers. Additive manufacturing may be performed with a variety of different materials, such as plastics, ceramics, or metals. Metal additive manufacturing involves multiple melting, re-melting, and solidification steps for different areas of the part.

Thermal stress is a significant problem in additive manufacturing. Metal additive manufacturing can produce significant thermal and solidification stresses depending on the part geometry and the associated heat flux out of particular areas of the part.

Related art ultrasonic evaluation processes have been used to evaluate internal defects, such as porosity formation, in a part during an additive manufacturing process. These related art processes use a single excitation mode to evaluate reflection effects that are indicative of pores in the part. However, the porosity size of the pores formed in parts is typically sufficiently small such that evidence of a pore in the reflected signal cannot be distinguished from noise in the reflected signal and alternate reflections due to a variety of other events occurring during the additive manufacturing process.

Additionally, related art ultrasonic evaluation processes work only with direct excitation into the part from the build plate, and are not suitable for parts having overhangs or through support structures that are generally designed to have porosity to aid in removal of the part from the build plate.

Furthermore, related art defect detection processes are not performed until after the build of part is complete, which may take up to one week or more, depending on the size and complexity of the part. Accordingly, these related art defect detection processes are costly, time-consuming, and wasteful.

SUMMARY

Aspects of the present disclosure are directed to various methods of additive manufacturing a part on a build plate. In one embodiment, the method includes additive manufacturing at least a first layer of the part on the build plate, supplying a series of frequencies to the build plate from a resonate probe connected to the build plate, processing a received response from an ultrasonic detector connected to the build plate, determining a series of resonant frequencies of the build plate and a corresponding series of peak intensities at the series of resonant frequencies from the received response, and comparing the series of resonant frequencies and the corresponding series of peak intensities to a set of reference resonant frequencies and a corresponding set of reference peak intensities, respectively. The method also includes calculating an intensity difference between a peak intensity of the series of peak intensities and a corresponding reference peak intensity of the set of reference peak intensities or a frequency difference between a resonant frequency of the series of resonant frequencies and a corresponding reference resonant frequency of the set of reference resonant frequencies, and additive manufacturing at least one subsequent layer of the part when the intensity difference or the frequency difference is below a threshold.

The method may also include determining when the intensity difference or the frequency difference corresponds to a geometric change in the part greater than a threshold geometric change.

The method may include additive manufacturing the subsequent layer of the part when the intensity difference or the frequency difference exceeds the threshold and the geometric change in the part is greater than the threshold geometric change.

The method may include terminating the additive manufacturing of the part when the intensity difference or the frequency difference exceeds the threshold and the geometric change in the part is less than the threshold geometric change.

The method may also include determining the set of reference resonant frequencies and the corresponding set of reference peak intensities.

Determining the set of reference resonant frequencies and the corresponding set of reference peak intensities may include performing ultrasonic spectrometry on the build plate with an unstressed part on the build plate, such that the set of reference resonant frequencies are a set of baseline resonant frequencies and the set of reference peak intensities are a set of baseline peak intensities.

Determining the set of reference resonant frequencies and the corresponding set of reference peak intensities may include performing ultrasonic spectrometry on the build plate during a previous stage of the additive manufacturing of the part.

The threshold may be from approximately (about) 0.1% to approximately (about) 25%.

The series of frequencies may be a range of frequencies from approximately (about) 1 Hz to approximately (about) 100 kHz, or from approximately (about) 1 Hz to approximately (about) 20 kHz. In general, higher frequencies tend to activate more complex resonate modes in the part and may be utilized to determine stress build-up in more complex parts (e.g., parts having complex geometry) because relatively lower resonate modes may not be as sensitive to stress build-up in specific part orientations or locations.

The method may include adjusting a parameter of the additive manufacturing process, such as scan speed of a laser, energy density of the laser, and/or a location of the laser, when the intensity difference or the frequency difference exceeds the threshold.

The present disclosure is also directed to various methods of determining thermal stresses in a part during additive manufacturing of the part on a build plate. In one embodiment, the method includes supplying a series of frequencies to the build plate from a resonate probe connected to the build plate, processing a received response from an ultrasonic detector connected to the build plate, determining a series of resonant frequencies of the build plate and a corresponding series of peak intensities from the received response, and comparing the series of resonant frequencies and the corresponding series of peak intensities to a set of reference resonant frequencies and a corresponding set of reference peak intensities, respectively. The method also includes calculating an intensity difference between a peak intensity of the series of peak intensities and a corresponding reference peak intensity of the set of reference peak intensities, or a frequency difference between a resonant frequency of the series of resonant frequencies and a corresponding reference resonant frequency of the set of reference resonant frequencies, and determining that the thermal stresses have developed in the part when the intensity difference or the frequency difference exceeds a threshold.

The method may include determining the set of reference resonant frequencies and the corresponding set of reference peak intensities.

Determining the set of reference resonant frequencies and the corresponding set of reference peak intensities may include performing ultrasonic spectrometry on the build plate with an unstressed part on the build plate, such that the set of reference resonant frequencies is a set of baseline resonant frequencies and the set of reference peak intensities is a set of baseline peak intensities.

Determining the set of reference resonant frequencies and the corresponding set of reference peak intensities may include performing ultrasonic spectrometry on the build plate during a previous stage of the additive manufacturing of the part.

The threshold may be from approximately (about) 0.1% to approximately (about) 25%.

The series of frequencies may be a range of frequencies from approximately (about) 1 Hz to approximately (about) 100 kHz.

The present disclosure is also directed to various embodiments of a system configured for additive manufacturing of a part. In one embodiment, the system includes a build plate, a heat source configured to additive manufacture the part on the build plate, a resonate probe connected to the build plate configured to supply a series of frequencies to the build plate, an ultrasonic detector connected to the build plate configured to detect a series of resonant frequencies and a corresponding series of peak intensities of the build plate, and a processor (e.g., a computer) configured to receive an output signal from the ultrasonic detector. The processor is configured to compare the series of resonant frequencies and the corresponding series of peak intensities to a set of reference resonant frequencies and a corresponding set of reference peak intensities, respectively. The processor is also configured to calculate an intensity difference between a peak intensity of the series of peak intensities and a corresponding reference peak intensity of the set of reference peak intensities or a frequency difference between a resonant frequency of the series of resonant frequencies and a corresponding reference resonant frequency of the set of reference resonant frequencies.

The series of frequencies configured to be supplied by the resonate probe may be a range of frequencies from approximately (about) 1 Hz to approximately (about) 100 kHz.

The processor may be configured to terminate the additive manufacturing of the part when the intensity difference or the frequency difference exceeds a threshold.

This summary is provided to introduce a selection of features and concepts of embodiments of the present disclosure that are further described below in the detailed description. This summary is not intended to identify key or essential features of the claimed subject matter, nor is it intended to be used in limiting the scope of the claimed subject matter. One or more of the described features may be combined with one or more other described features to provide a workable device.

BRIEF DESCRIPTION OF THE DRAWINGS

The features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale. Additionally, the patent or application file contains at least one drawing executed in color. Copies of this patent or patent application publication with color drawing(s) will be provided by the Office upon request and payment of the necessary fee.

DETAILED DESCRIPTION

The present disclosure is directed to various embodiments of an apparatus and a method for additive manufacturing a part and determining the development of stresses (e.g., thermal stresses) in the part during the additive manufacturing process. In one or more embodiments, the method includes supplying a range or a series of different ultrasonic frequencies to a build plate on which the part is being built by additive manufacturing to excite the build plate at a series of higher order mode resonant frequencies. The method also includes comparing these resonant frequencies and corresponding peak intensities at these resonant frequencies to the resonant frequencies and the corresponding peak intensities of the build plate when an unstressed part is on the build plate to determine a shift in one or more of the resonant frequencies and/or one or more of the peak intensities, which is indicative of the development of stress (e.g., thermal stress) in the part. The method is also configured to terminate the additive manufacturing process if the results of the comparison indicate that unacceptably high stress (e.g., thermal stress) has developed in the part or a major stress relief event, such as a crack, has occurred in the part. The apparatus and method of the present disclosure are also configured to determine the development of stresses (e.g., thermal stresses) in the part in situ (e.g., during the additive manufacturing process before completion of the part). In this manner, the apparatus and method of the present disclosure is configured to terminate the additive manufacturing process before completion of the part if it is determined that unacceptably high stresses have developed in the part, which is configured to conserve material compared to related art processes in which the part must be completed before any defects can be detected.

Figure 1:
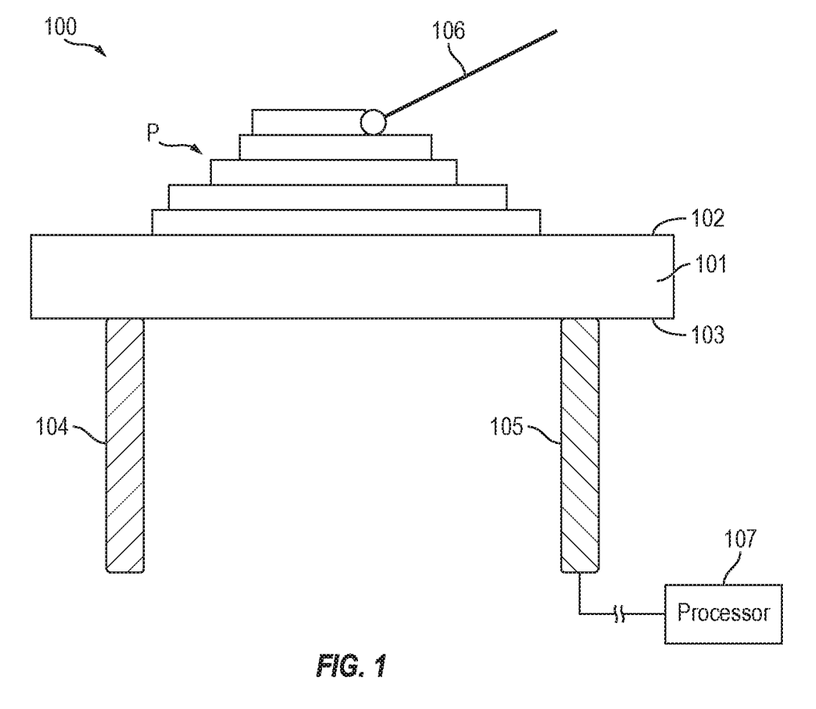
FIG. 1 is a schematic view of a system for additive manufacturing a part and determining the development of stresses in the part during the additive manufacturing process according to one embodiment of the present disclosure.

FIG. 1 illustrates a system 100 for additive manufacturing a part P and for determining the development of thermal stresses in the part P during the additive manufacturing process. In the illustrated embodiment, the system 100 includes a build plate 101 having an upper surface 102 and a lower surface 103 opposite the upper surface 102, an ultrasonic resonator 104 in contact (e.g., direct contact) with the lower surface 103 of the build plate 101, an ultrasonic detector 105 in contact (e.g., direct contact) with the lower surface 103 of the build plate 101, and an additive heat source 106. In one or more embodiments, the ultrasonic resonator 104 and the ultrasonic detector 105 may be connected to any other suitable portions of the build plate 101. The additive heat source 106 is configured to form, layer-by-layer, the part P on the upper surface 102 of the build plate 101. The additive heat source 106 may be configured to form the part P by suitable process or combination of processes, such as powder bed fusion, in which a laser heats and melts a powdered material (e.g., powdered metal) and the melted material cools and fuses together to form the part P layer-by-layer. The additive heat source 106 of the system 100 may be utilized to additively manufacture the part P out of any suitable material, such as plastic, ceramic, or metal.

The ultrasonic resonator 104 is configured to supply a range of frequencies or a series of discrete frequencies within a range to the build plate 101. In one or more embodiments, the ultrasonic resonator 104 is configured to sweep or scan through and supply a range of frequencies to the build plate 101. In one or more embodiments, the ultrasonic resonator 104 is configured to sweep through a series of frequencies ranging from approximately 1 Hz to approximately 100 kHz. In one or more embodiments, the ultrasonic resonator 104 is configured to sweep through a series of frequencies ranging from approximately 1 Hz to approximately 20 kHz. In general, higher frequencies tend to activate more complex resonate modes in the part P and may be utilized to determine stress build-up in more complex parts (e.g., parts having complex geometry) because relatively lower resonate modes may not be as sensitive to stress build-up in specific part orientations or locations.

The ultrasonic detector 105 is configured to detect a series of resonant frequencies of the build plate 101 and a corresponding series of peak intensities of the build plate 101 as the ultrasonic resonator 104 is supplying the frequencies to the build plate 101. An output signal of the ultrasonic detector 105, which includes the series of resonant frequencies of the build plate 101 and the corresponding series of peak intensities of the build plate 101, is supplied to a processor 107 (e.g., a computer including a processor) configured to analyze the resonant frequencies and the corresponding peak intensities of the build plate 101 to determine if stresses (e.g., thermal stresses) have developed in the part P, as described in more detail below.

During additive manufacturing of the part P on the build plate 101, the part P is welded to the build plate 101. Accordingly, stress (e.g., thermal stress) that develops in the part P during additive manufacturing imparts stress in the build plate 101. The stress that is imparted to the build plate 101 by the part P alters (e.g., shifts) the resonant frequency of one or more higher order modes of the build plate 101 and/or the peak intensity at one or more of the resonant frequencies of the build plate 101. As described in more detail below, the processor 107 is configured to determine (e.g., calculate) these shifts in peak intensity and/or resonant frequency of the build plate 101 to determine if stresses (e.g., thermal stresses) have developed in the part P during the additive manufacturing process.

In one or more embodiments, the shift (e.g., increase or decrease) in the resonant frequency may occur at at least one higher order mode, two or more of the higher order modes, or all of the higher order modes of the build plate 101. In one or more embodiments in which the resonant frequency shift occurs at two or more of the higher order modes, the frequency shift at one of the higher order modes may be different than the frequency shift at one or more other higher order modes of the build plate 101. In one or more embodiments, the shift (e.g., increase or decrease) in the peak intensity may occur at at least one higher order mode, two or more of the higher order modes, or all of the higher order modes of the build plate 101. In one or more embodiments in which the peak intensity shift occurs at two or more of the higher order modes, the peak intensity at one of the higher order modes may be different than the peak intensity shift at one or more other higher order modes of the build plate 101.

Figure 2:
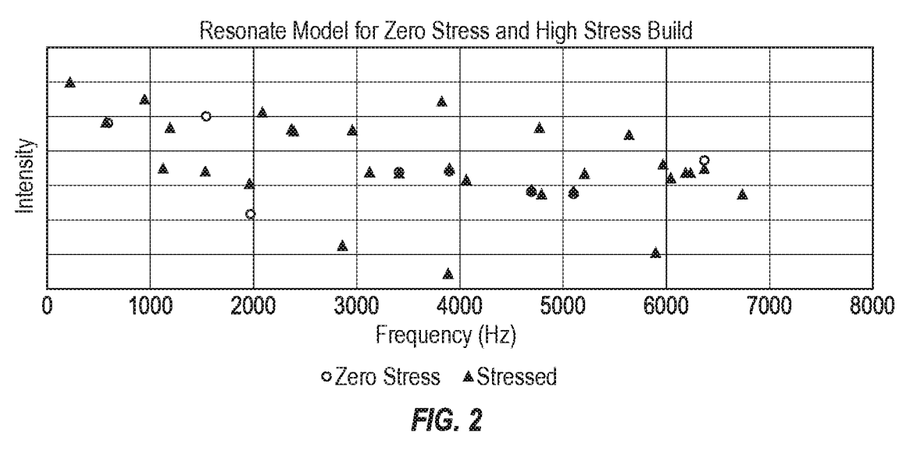
FIG. 2 is a plot showing different resonate spectra and corresponding peak intensity spectra for stressed and unstressed parts according to one embodiment of the present disclosure.

FIG. 2 is a graph depicting a series of resonant frequencies and corresponding peak intensities of the build plate 101 as the part P is being additively manufactured on the build plate 101 according to one embodiment of the present disclosure. These resonant frequencies and corresponding peak intensities of the build plate 101 are detected by the ultrasonic detector 105 as the ultrasonic resonator 104 is supplying a range or a series of frequencies to the build plate 101 (e.g., as the ultrasonic resonator 104 is sweeping or scanning through and supplying a range of frequencies to the build plate 101). FIG. 2 also depicts a series of resonant frequencies and corresponding peak intensities of the build plate 101 when an unstressed part is on the build plate (e.g., FIG. 2 depicts a series of baseline resonant frequencies and corresponding baseline peak intensities of the build plate 101).

As illustrated in FIG. 2, the peak intensity of the build plate 101 at a resonant frequency of approximately 1,500 Hz when the additively manufactured part P (or at least one layer of the part P) is on the build plate 101 is less than the peak intensity of the build plate 101 at the resonant frequency of approximately 1,500 Hz when the unstressed part is on the build plate 101 (e.g., stresses developed in the part P during the additive manufacturing process reduced the peak intensity of the build plate 101 at the resonant frequency of approximately 1,500 Hz). Additionally, as illustrated in FIG. 2, the peak intensity of the build plate 101 at a resonant frequency of approximately 2,000 Hz when the additively manufactured part P (or at least one layer of the part P) is on the build plate 101 is greater than the peak intensity of the build plate 101 at the resonant frequency of approximately 2,000 Hz when the unstressed part is on the build plate 101 (e.g., stresses developed in the part P during the additive manufacturing process increased the peak intensity of the build plate 101 at the resonant frequency of approximately 2,000 Hz). Although FIG. 2 depicts the resonant frequencies and corresponding peak intensities of the build plate 101 at 40 higher order modes of the build plate 101, in one or more embodiment, the system 100 may be utilized to determine the resonant frequencies and corresponding peak intensities of any other suitable number of higher order modes of the build plate 101, such as, for instance from 10 to 60 higher order modes.

The processor 107 is configured to detect changes (e.g., shifts) in one or more of the resonant frequencies and/or the peak intensity at one or more of the resonant frequencies of the build plate 101 by comparing the resonant frequencies and corresponding peak intensities of the build plate 101 when the part P is being additively manufactured on the build plate 101 to the resonant frequencies and corresponding peak intensities of the build plate 101 when an unstressed part is on the build plate 101 (e.g., as illustrated in FIG. 2). In one or more embodiments, the resonant frequencies and peak intensities of the build plate 101 with the unstressed part on the build plate 101 may be determined and stored in memory (e.g., stored in memory in a lookup table) before the system 100 is utilized to additively manufacture the part P (e.g., the baseline resonant frequencies and associated peak intensities of the build plate 101 may be determined and stored in a lookup table before the system 100 is utilized to additively manufacture the part P).

In one or more embodiments, the results of the comparison may be utilized to identify a defect or a failure event in the build of the part P. For instance, thermal stress in the part P can cause cracking of one or more support structures in the part P. Stress developed in the part P during the build, prior to fracture, results in a continuous shift in one or more specific modes of the build plate 101 depending on the type of stress (e.g., thermal stress) and the location of the stress within the part P. A fracture in one or more support structures in the part P constitutes a large stress relief in the part P, which would cause a sharp (e.g., discontinuous) shift in one or more modes of the build plate 101, rather than a gradual shift.

In one or more embodiments, stress generated in the part P during additive manufacturing may cause an approximately 1 Hz shift in the resonant frequency of one or more higher order modes of the build plate 101 per layer added during the build of the part P (e.g., each layer added to the part P during the additive manufacturing process may cause an approximately 1 Hz shift in the resonant frequency of one or more higher order modes of the build plate 101). In one or more embodiments, the resonant frequency shift per layer added to the part P may accumulate and shift the resonant frequency of one or more higher order modes of the build plate 101 by approximately 100 Hz or more for the complete build of the part P. The stress developed in the part P and imparted to the build plate 101 may increase and/or decrease the resonant frequencies of one or more higher order modes of the build plate 101 depending on whether vibratory modes are developed or eliminated due to, for instance, the geometry of the part P, the location of the stress within the part P, and/or the type of stress (e.g., thermal stress) developed in the part P.

In one or more embodiments, stress developed in the part P during additive manufacturing may cause an approximately 0.1% shift in the normalized peak intensity at one or more of the resonant frequencies of the build plate 101 per layer added during the build of the part P (e.g., each layer added to the part P during the additive manufacturing process may cause an approximately 0.1% shift in the normalized peak intensity at one or more of the higher order modes of the build plate 101). In one or more embodiments, the normalized peak intensity shift per layer added to the part P may accumulate and shift the normalized peak intensity at one or more higher order modes of the build plate 101 by approximately 100% or more for the complete build of the part P. The stress developed in the part P and imparted to the build plate 101 may increase and/or decrease the normalized peak intensity at one or more higher order modes of the build plate 101 depending on whether vibratory modes are developed or eliminated due to, for instance, the geometry of the part P, the location of the stress within the part P, and/or the type of stress (e.g., thermal stress) developed in the part P.

In one or more embodiments, gradual changes in the normalized peak intensity and/or the resonant frequency at one or more of the higher order modes of the build plate 101 (e.g., an approximately 1% relative change or less in normalized peak intensity and/or resonant frequency per layer added to the part P) is indicative of a gradual change in the geometry of the part P during the build due to thermal stresses developing the part, whereas sharp changes in the normalized peak intensity and/or the resonant frequency at one or more of the higher order modes of the build plate 101 (e.g., an approximately 2.5% relative change or more in normalized peak intensity and/or resonant frequency per layer added to the part) is indicative of a major stress relief event in the part P, such as a crack in the part P and/or failure of one or more of the support structures of the part P. That is, rapid or sharp changes (e.g., approximately 2.5% or greater per layer added to the part P) in the normalized peak intensity and/or the resonant frequency indicate a build failure. In one or more embodiments, the additive manufacturing process may be halted prior to completion of the part P if the processor 107 determines a rapid change in the normalized peak intensity and/or the resonant frequency of one or more of the higher order modes of the build plate 101, which is configured to conserve material compared to related art processes in which the part must be completed before any defects can be detected.

In one or more embodiments, if the processor 107 determines a gradual change (e.g., approximately 1% or less change per layer added to the part P) in the normalized peak intensity and/or the resonant frequency of one or more higher order modes of the build plate 101, the processor 107 may control a controller to adjust one or more parameters of the additive manufacturing process, such as scan speed of the additive heat source 106, energy density output by the additive heat source 106, and/or a position of the additive heat source 106, to reduce or control (e.g., prevent from increasing) the stresses developed in the part P during the build. In one or more embodiments, the gradual change in the normalized peak intensity and/or the resonant frequency of one or more higher order modes of the build plate 101 may be correlated to thermal models of the build, and, based on this correlation, the controller may adjust one or more of the parameters of the additive manufacturing process to reduce or control (e.g., prevent from increasing) the stresses developed in the part P during the build.

Figure 3A:
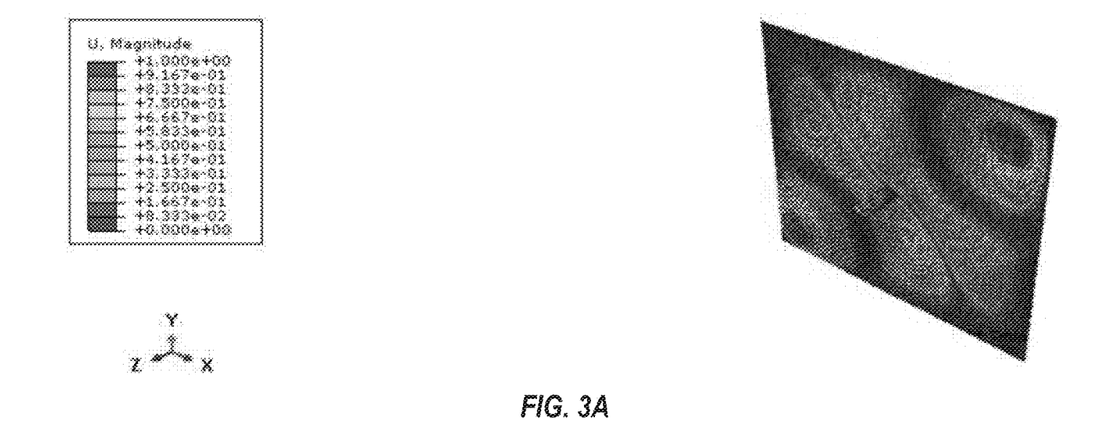
FIGS. 3A-3B are plots depicting a mode shape of a build plate with torque applied to a part on the build plate, and a mode shape of the build plate without torque applied to the part, respectively, according to one embodiment of the present disclosure.
Figure 3B:
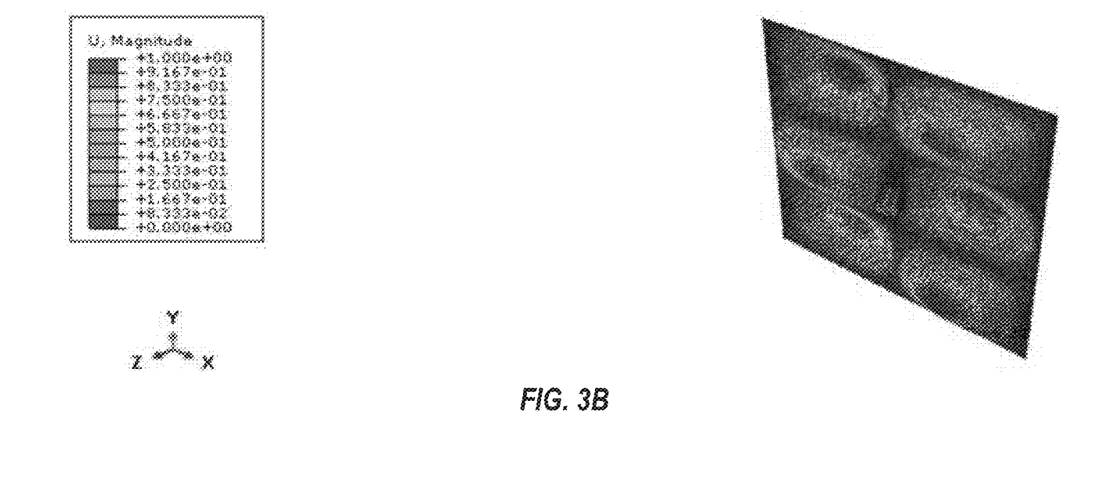

FIG. 3A is a plot depicting a mode shape of the build plate 101 with a 0.1 radian torque applied to the part P on the build plate 101, and FIG. 3B is a plot depicting a mode shape of the build plate 101 without a torque applied to the part P on the build plate 101. This change in the mode shape of the build plate 101 may be utilized to determine the development of stresses in the part P during the process of additively manufacturing the part P on the build plate 101.

Figure 4:
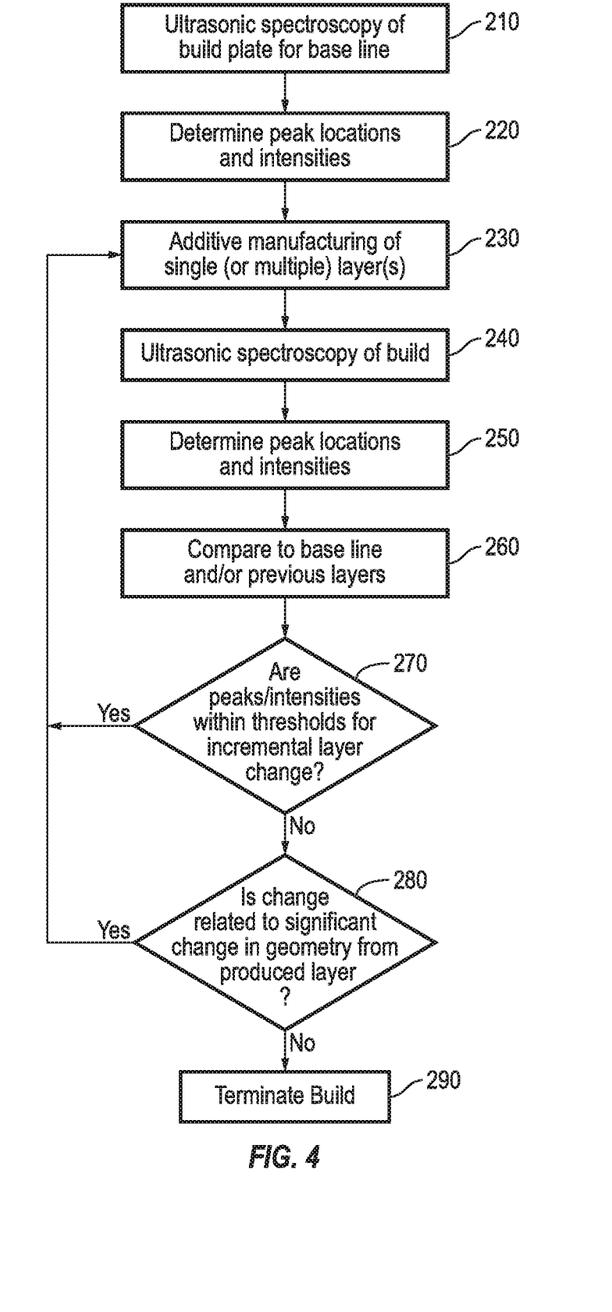
FIG. 4 is a flowchart depicts tasks of a method of additive manufacturing a part and determining the development of stresses in the part during the additive manufacturing process according to one embodiment of the present disclosure.

FIG. 4 is a flowchart illustrating tasks of a method 200 of additive manufacturing a part on a build plate according to one embodiment of the present disclosure. In the illustrated embodiment, the method 200 includes a task 210 of performing ultrasonic spectroscopy on the build plate with an unstressed part on the build plate (e.g., supplying a series of frequencies to the build plate with an ultrasonic resonator, such as by sweeping through a range of frequencies ranging from approximately 1 Hz to approximately 100 kHz, or from approximately 1 Hz to approximately 20 kHz), and a task 220 of determining a set of baseline resonant frequencies of the build plate and a corresponding set of baseline intensities at the set of baseline resonant frequencies with the unstressed part on the build plate. In one or more embodiments, the method 200 may include storing the set of baseline resonant frequencies and the corresponding set of baseline intensities in memory (e.g., the set of baseline resonant frequencies and the corresponding set of baseline intensities may be stored in memory in a lookup table).

In the illustrated embodiment, the method also includes a task 230 of performing additive manufacturing to form a single layer or two or more layers of the part (e.g., the task 230 may include additively manufacturing an initial layer or two or more initial layers of the part). The task 230 of additively manufacturing one or more layers of the part may include any suitable type or kind of additive manufacturing process, such as powder bed fusion.

The method also includes a task 240 of performing ultrasonic spectroscopy on the build plate with one or more layers of the part formed on the build plate (e.g., supplying a series of frequencies to the build plate with an ultrasonic resonator connected to the build plate, such as by sweeping through a range of frequencies ranging from approximately 1 Hz to approximately 100 kHz, or from approximately 1 Hz to approximately 20 kHz), and a task 250 of determining a set of resonant frequencies of the build plate and a corresponding set of peak intensities at the set of resonant frequencies with the one or more layers of the part on the build plate (e.g., detecting, with an ultrasonic detector connected to the build plate, the set of resonant frequencies and the corresponding set of peak intensities of the build plate with the one or more layers of the part on the build plate).

In the illustrated embodiment, the method 200 also includes a task 260 of comparing the set of resonant frequencies and the corresponding set of peak intensities to the set of baseline resonant frequencies and the corresponding set of baseline intensities, respectively. In one or more embodiments, the task 260 of comparing the set of resonant frequencies and the corresponding set of peak intensities to the set of baseline resonant frequencies and the corresponding set of baseline intensities may be performed by a processor (e.g., a computer including a processor) coupled to the ultrasonic detector and configured to receive an output signal of the ultrasonic detector. The task 260 of comparing the set of resonant frequencies and the corresponding set of peak intensities to the set of baseline resonant frequencies and the corresponding set of baseline intensities, respectively, may include plotting the resonant frequencies, the baseline resonant frequencies, the peak intensities, and the baseline peak intensities (e.g., as shown in FIG. 2). As described above, stresses (e.g., thermal stresses) that develop in the layers of the part are imparted to the build plate, and the stresses imparted to the build plate shift one or more of the resonant frequencies and/or one or more of the corresponding peak intensities of the build plate.

Following the task 260 of comparing the resonant frequencies and the peak intensities to the baseline resonant frequencies and the baseline peak intensities, respectively, the method includes a task 270 of calculating (e.g., with a processor) any change in one or more of the resonant frequencies and/or any change in one or more of the peak intensities of the build plate due to the presence of one or more layers of the part on the build plate. In one or more embodiments, the task 270 may include calculating an absolute value difference and/or a percentage change of one or more resonant frequencies and/or one or more peak intensities (e.g., calculating a shift in one or more of the resonant frequencies and/or one or more of the peak intensities of the build plate due to the task 230 of additively manufacturing one or more layers of the part on the build plate). In the illustrated embodiment, the task 270 also includes determining whether the change in one or more of the resonant frequencies of the build plate and/or the change in one or more of the peak intensities is below a threshold value. In one or more embodiments, the threshold value may be a percentage change in the resonant frequency and/or the peak intensity in the range from approximately 0.1% to approximately 25%. In one or more embodiments, the threshold value may be approximately 1% (e.g., an approximately 1% change in one or more of the resonant frequencies of the build plate and/or an approximately 1% change in one or more of the normalized peak intensities). In one or more embodiments, the threshold may be approximately 2.5% (e.g., an approximately 2.5% change in one or more of the resonant frequencies of the build plate and/or an approximately 2.5% change in one or more of the normalized peak intensities).

If the changes in the resonant frequencies and the peak intensities of the build plate are all below the threshold value, then the method 200 proceeds to task 230 and one or more additional layers are added to the part by additive manufacturing.

If the change in one or more of the resonant frequencies or one or more of the peak intensities of the build plate exceeds the threshold value, then the method 200 includes a task 280 of determining whether the change is related to a significant change in the geometry of the part following the task 230 of additively manufacturing one or more layers of the part (e.g., the task 280 may include determining whether the change in the geometry of the part exceeds a threshold geometric change). Significant geometric changes in the part are expected to affect the resonant frequency spectrum and/or the associated peak intensities of the build plate. Accordingly, changes in resonant frequency and/or peak intensity that exceed the threshold value following the task 230 of adding one or more layers to the part that significantly change the geometry of the part may not be due to undesirable stress development in the part, such as major stress relief event in the part (e.g., a crack in the part). The task 280 of determining whether the change in the resonant frequency and/or the peak intensity of the build plate is due to a significant geometric change of the part may be performed by referencing a part file (e.g., a computer-aided design (CAD) file) containing the geometry of the part that is utilized during the task 230 of additively manufacturing the part. If the change in one or more of the resonant frequencies and/or one or more peak intensities occurs following a significant geometric change in the part due to the task 230 of adding one or more layers to the part, then the method 200 proceeds to task 230 and one or more additional layers are added to the part by the additive manufacturing process. If the change in one or more of the resonant frequencies and/or one or more peak intensities occurs without an associated significant change in the geometry of the part, then the method 200 includes a task 290 of terminating the build before the completion of the part because the shift in resonant frequency and/or peak intensity is likely due to undesirable stress development in the part or a stress relief event (e.g., a crack) in the part that renders the part defective.

If the changes in the resonant frequencies and the peak intensities of the build plate remain below the threshold value, or if the change in one or more of the resonant frequencies or one or more of the peak intensities exceeds the threshold value but this change is attributed to a significant geometric change in the part, then the task 230 of additively manufacturing one or more additional layers of the part is repeated until the part is finished.

In the illustrated embodiment, following the task 230 of additively manufacturing the first layer or the first layers of the part on the build plate, the resonant frequencies and the peak intensities of the build plate are compared against the baseline resonant frequencies and the baseline peak intensities, respectively, determined during task 220. Following subsequent tasks 230 of additively manufacturing additional layers of the part on the build plate, the resonant frequencies and peak intensities of the build plate may be compared against the baseline resonant frequencies and the baseline peak intensities, respectively, and/or the resonant frequencies and the peak intensities of the build plate may be compared against the resonant frequencies and the peak intensities, respectively, of the build plate before the one or more additional layers were added to the part in task 230 (e.g., the task 260 may include comparing the resonant frequencies and peak intensities of the build plate when the part has n layers against the resonant frequencies and peak intensities of the build plate when the part had n−1 layers). That is, the task 260 may compare the resonant frequencies and the peak intensities of the build plate at the current stage of the additive manufacturing process against the resonant frequencies and the peak intensities of the build plate during a previous stage of the additive manufacturing process such that the task 270 determines a layer-by-layer shift in one or more resonant frequencies and/or one or more peak intensities of the build plate. In this manner, the method 200 may determine that stresses (e.g., thermal stresses) have developed in the part or a stress relief event (e.g., a crack) has developed in the part by determining the absolute shift in the resonant frequencies and the peak intensities relative to the baseline in which an unstressed part is on the build plate and/or by determining the shift in the resonant frequencies and the peak intensities due to the incremental addition of one or more layers to the part.

While this invention has been described in detail with particular references to embodiments thereof, the embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention. Additionally, although relative terms such as "horizontal," "vertical," "upper," "lower," and similar terms have been used herein to describe a spatial relationship of one element to another, it is understood that these terms are intended to encompass different orientations of the various elements and components of the invention in addition to the orientation depicted in the figures. Additionally, as used herein, the term "substantially," "about," and similar terms are used as terms of approximation and not as terms of degree, and are intended to account for the inherent deviations in measured or calculated values that would be recognized by those of ordinary skill in the art. Furthermore, as used herein, when a component is referred to as being "on" or "coupled to" another component, it can be directly on or attached to the other component or intervening components may be present therebetween.

The tasks described above may be performed in the order described or in any other suitable sequence. Additionally, the methods described above are not limited to the tasks described. Instead, for each embodiment, one or more of the tasks described above may be absent and/or additional tasks may be performed.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. Additionally, the system and/or any other relevant devices or components according to embodiments of the present invention described herein may be implemented utilizing any suitable hardware, firmware (e.g. an application-specific integrated circuit), software, or a combination of software, firmware, and hardware.

What is claimed is:

1. A method of additive manufacturing a part on a build plate, the method comprising:

additive manufacturing at least a first layer of the part on the build plate;

supplying a plurality of frequencies to the build plate from a resonate probe connected to the build plate;

processing a received response from an ultrasonic detector connected to the build plate;

determining a plurality of resonant frequencies of the build plate and a corresponding plurality of peak intensities at the plurality of resonant frequencies from the received response;

comparing the plurality of resonant frequencies and the corresponding plurality of peak intensities to a set of reference resonant frequencies and a corresponding set of reference peak intensities, respectively;

calculating at least one of an intensity difference between a peak intensity of the plurality of peak intensities and a corresponding reference peak intensity of the set of reference peak intensities and a frequency difference between a resonant frequency of the plurality of resonant frequencies and a corresponding reference resonant frequency of the set of reference resonant frequencies; and additive manufacturing at least one subsequent layer of the part when the at least one of the intensity difference and the frequency difference is below a threshold.

2. The method of claim 1, further comprising determining when the at least one of the intensity difference and the frequency difference corresponds to a geometric change in the part greater than a threshold geometric change.

3. The method of claim 2, further comprising additive manufacturing the at least one subsequent layer of the part when the at least one of the intensity difference and the frequency difference exceeds the threshold and the geometric change in the part is greater than the threshold geometric change.

4. The method of claim 2, further comprising terminating the additive manufacturing of the part when the at least one of the intensity difference and the frequency difference exceeds the threshold and the geometric change in the part is less than the threshold geometric change.

5. The method of claim 4, wherein the plurality of frequencies is a range of frequencies from about 1 Hz to about 100 kHz.

6. The method of claim 4, wherein the plurality of frequencies is a range of frequencies from about 1 Hz to about 20 kHz.

7. The method of claim 1, further comprising determining the set of reference resonant frequencies and the corresponding set of reference peak intensities.

8. The method of claim 7, wherein the determining the set of reference resonant frequencies and the corresponding set of reference peak intensities comprises performing ultrasonic spectrometry on the build plate with an unstressed part on the build plate,
wherein the set of reference resonant frequencies are a set of baseline resonant frequencies, and
wherein the set of reference peak intensities are a set of baseline peak intensities.

9. The method of claim 7, wherein the determining the set of reference resonant frequencies and the corresponding set of reference peak intensities comprises performing ultrasonic spectrometry on the build plate during a previous stage of the additive manufacturing of the part.

10. The method of claim 1, wherein the threshold is from about 0.1% to about 25%.

11. The method of claim 1, further comprising adjusting a parameter of the additive manufacturing process when the at least one of the intensity difference and the frequency difference exceeds the threshold, and wherein the parameter is selected from the group consisting of scan speed of a laser, energy density of the laser, a location of the laser, and combinations thereof.

12. A method of determining thermal stresses in a part during additive manufacturing of the part on a build plate, the method comprising:
supplying a plurality of frequencies to the build plate from a resonate probe connected to the build plate;
processing a received response from an ultrasonic detector connected to the build plate;
determining a plurality of resonant frequencies of the build plate and a corresponding plurality of peak intensities from the received response;
comparing the plurality of resonant frequencies and the corresponding plurality of peak intensities to a set of reference resonant frequencies and a corresponding set of reference peak intensities, respectively;
calculating at least one of an intensity difference between a peak intensity of the plurality of peak intensities and a corresponding reference peak intensity of the set of reference peak intensities and a frequency difference between a resonant frequency of the plurality of resonant frequencies and a corresponding reference resonant frequency of the set of reference resonant frequencies; and determining that the thermal stresses have developed in the part when the at least one of the intensity difference and the frequency difference exceeds a threshold.

13. The method of claim 12, further comprising determining the set of reference resonant frequencies and the corresponding set of reference peak intensities.

14. The method of claim 13, wherein the determining the set of reference resonant frequencies and the corresponding set of reference peak intensities comprises performing ultrasonic spectrometry on the build plate with an unstressed part on the build plate,
wherein the set of reference resonant frequencies is a set of baseline resonant frequencies, and
wherein the set of reference peak intensities is a set of baseline peak intensities.

15. The method of claim 13, wherein the determining the set of reference resonant frequencies and the corresponding set of reference peak intensities comprises performing ultrasonic spectrometry on the build plate during a previous stage of the additive manufacturing of the part.

16. The method of claim 12, wherein the threshold is from about 0.1% to about 25%.

17. The method of claim 12, wherein the plurality of frequencies is a range of frequencies from about 1 Hz to about 100 kHz.

18. A system configured for additive manufacturing of a part, the system comprising:
a build plate;
a heat source configured to additive manufacture the part on the build plate;
a resonate probe connected to the build plate configured to supply a plurality of frequencies to the build plate;
an ultrasonic detector connected to the build plate configured to detect a plurality of resonant frequencies and a corresponding plurality of peak intensities of the build plate; and
a processor configured to receive an output signal from the ultrasonic detector,
wherein the processor is configured to compare the plurality of resonant frequencies and the corresponding plurality of peak intensities to a set of reference resonant frequencies and a corresponding set of reference peak intensities, respectively, and
wherein the processor is configured to calculate at least one of an intensity difference between a peak intensity of the plurality of peak intensities and a corresponding reference peak intensity of the set of reference peak intensities and a frequency difference between a resonant frequency of the plurality of resonant frequencies and a corresponding reference resonant frequency of the set of reference resonant frequencies.

19. The system of claim 18, wherein the plurality of frequencies configured to be supplied by the resonate probe is a range of frequencies from about 1 Hz to about 100 kHz.

20. The system of claim 18, wherein the processor is configured to terminate the additive manufacturing of the part when the at least one of the intensity difference and the frequency difference exceeds a threshold.

* * * * *